United States Patent [19]
Abbott et al.

[11] Patent Number: 6,111,754
[45] Date of Patent: Aug. 29, 2000

[54] CIRCUIT BOARD MOUNTING ASSEMBLY AND METHOD

[75] Inventors: Ryan Abbott, Cupertino; Mark Feldmeyer; David Baik, both of San Jose, all of Calif.

[73] Assignee: Hewlett-Packard Company, Palo Alto, Calif.

[21] Appl. No.: 09/470,834

[22] Filed: Dec. 23, 1999

[51] Int. Cl.[7] .............................. H05K 5/00; H05K 7/16; A47B 81/00; G06F 1/16
[52] U.S. Cl. ..................... 361/724; 361/724; 361/726; 361/727; 361/683; 361/686; 312/223.2; 364/708.1
[58] Field of Search ..................... 361/724, 726, 361/727, 683, 686; 312/223.2; 364/708.1

[56] References Cited

U.S. PATENT DOCUMENTS

| | | | |
|---|---|---|---|
| 5,502,622 | 3/1996 | Cromwell | 361/801 |
| 5,506,758 | 4/1996 | Cromwell | 361/798 |
| 5,784,252 | 7/1998 | Villa et al. | 361/683 |
| 5,825,626 | 10/1998 | Hulick et al. | 361/724 |

*Primary Examiner*—Leo P. Picard
*Assistant Examiner*—Tung Minh Bui

[57] ABSTRACT

An electronic system, such as a computer, having a housing with a door opening into an interior of the housing. An insertion mechanism is mounted on the door and includes a handle provided on an exterior side of the door and a driver portion provided on an interior side. The driver portion includes a rotatable latch driver attached to the handle and a rotatable latch follower engaging the latch driver through a set of gears. A movable mount is slideably mounted onto the door and a circuit board assembly is mounted onto the movable mount. After the door of the housing is closed, rotation of the handle causes rotation of the latch driver, which, in turn, causes rotation of the latch follower. The latch driver and follower engage the movable mount such that their rotation causes forward movement of the movable mount and the circuit board assembly. This forward movement causes an edge connector provided along a forward edge of the circuit board assembly to mate with a connection socket provided in an interior portion of the housing.

32 Claims, 15 Drawing Sheets

CIRCUIT BOARD MOUNTING ASSEMBLY AND METHOD

BACKGROUND OF THE INVENTION

1. Field of the Invention

This invention relates to a system and method for mounting a printed circuit board onto a computer assembly.

2. Background

Printed circuit boards are thin plates on which computer chips and other electronic components are mounted. In recent years, circuit boards have been used extensively in electrical equipment. For example, computers are routinely constructed of a plurality of printed circuit boards, each containing a portion of the electronics required to allow the computer to operate.

A typical circuit board includes an edge connector provided along a leading or forward edge of the board. This edge connector includes electrical contacts which allow the circuit board to communicate with the rest of the computer system. These edge connectors are received in connection sockets located on another circuit board. The amount of force required to seat a circuit board into a connection socket is dependent on the number of contacts and type of electrical connectors used. For a given type of connector, the more contacts that must be mated typically increases the force that must be used to seat the circuit board. In an exemplary circuit board, the three edge connectors require a 100 pound insertion force. Insertion mechanisms have been used to apply an accurate and sufficiently powerful insertion force to an edge of the circuit board opposite the edge connectors. These types of mechanisms are located coplanar to the circuit board, and thus occupy space within the computer housing adjacent to the board edge, which may interfere with access to the internal components.

The computer housings used for state-of-the-art computer systems are often densely filled with multiple circuit boards, media drives, power supplies, cables, and other computer components. Such dense packing significantly increases the difficulty with which these components can be accessed for upgrading and repair. The case of the Power Mac G4 by Apple Computer, Inc. has a swing-open side door that allows easy access to the internal components. In the Power Mac G4, the motherboard and other key components are mounted onto the door, leaving the power supply, media drives, and other non-circuit board components inside the computer housing.

The use of ribbon cables to connect components results in increased cost and decreased performance, as compared to systems using edge connectors; circuit board edge connectors provide higher speed signals and better signal integrity. However, the Power Mac's design uses ribbon cables to enable the door mounting of the circuit board. The ribbon cables are needed to provide a connection between the motherboard and the other system components that can flex to accommodate the opening and closing of the door.

SUMMARY

In accordance with an aspect of the present invention, an electronic system, such as a computer, comprises a housing having a plurality of walls, a door provided on a wall of said housing, said door having an open position and a closed position, a connection socket provided on an interior portion of said housing, and an insertion mechanism mounted on said door. The insertion mechanism comprises a driver portion accessible from an exterior side of said door and movable from an unlatched position to a latched position, and a movable mount provided on an interior side of said door and mechanically coupled to said driver portion. A circuit board assembly is mounted on said movable mount and has an edge connector along a forward edge of said circuit board assembly such that when said driver portion moves from said unlatched position to said latched position, said movable mount moves in a forward direction, inserting said edge connector into said connection socket.

In accordance with another aspect of the present invention, a method for mounting a circuit board assembly with an edge connector is described. The method comprises providing a housing having an open door on one side and a connection socket therein, providing a movable mount on an interior side of said door, mounting a circuit board assembly onto said movable mount, closing said door, and actuating a driver from an exterior side of said door, said driver moving said movable mount in a forward direction to mate said edge connector with said connection socket.

In accordance with yet another aspect of the present invention, a electronic system comprises a housing, a rail system provided on said housing, and a driver portion. The driver portion comprises a handle having a unlatched position and a latched position, and a latch driver connected to said handle and rotatably connected to said housing through a first axis of rotation. A mount is slideably attached to said rail system and engages said latch driver such that as said handle is moved from said unlatched position to said latched position, said latch driver exerts a force on said mount in a forward direction urging said mount from a first location along said rail system to a second location along said rail system. A connection socket is provided on said housing, and a circuit board assembly is provided having an edge connector along a forward edge, said circuit board assembly being attached to said mount such that when said mount is in said first location, said edge connector is distant from said connection socket, and when said mount is in said second location, said edge connector is mated with said connection socket.

Other features and advantages of the invention will become apparent from the following detailed description, taken in conjunction with the accompanying drawings which illustrate, by way of example, the features in accordance with the invention.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
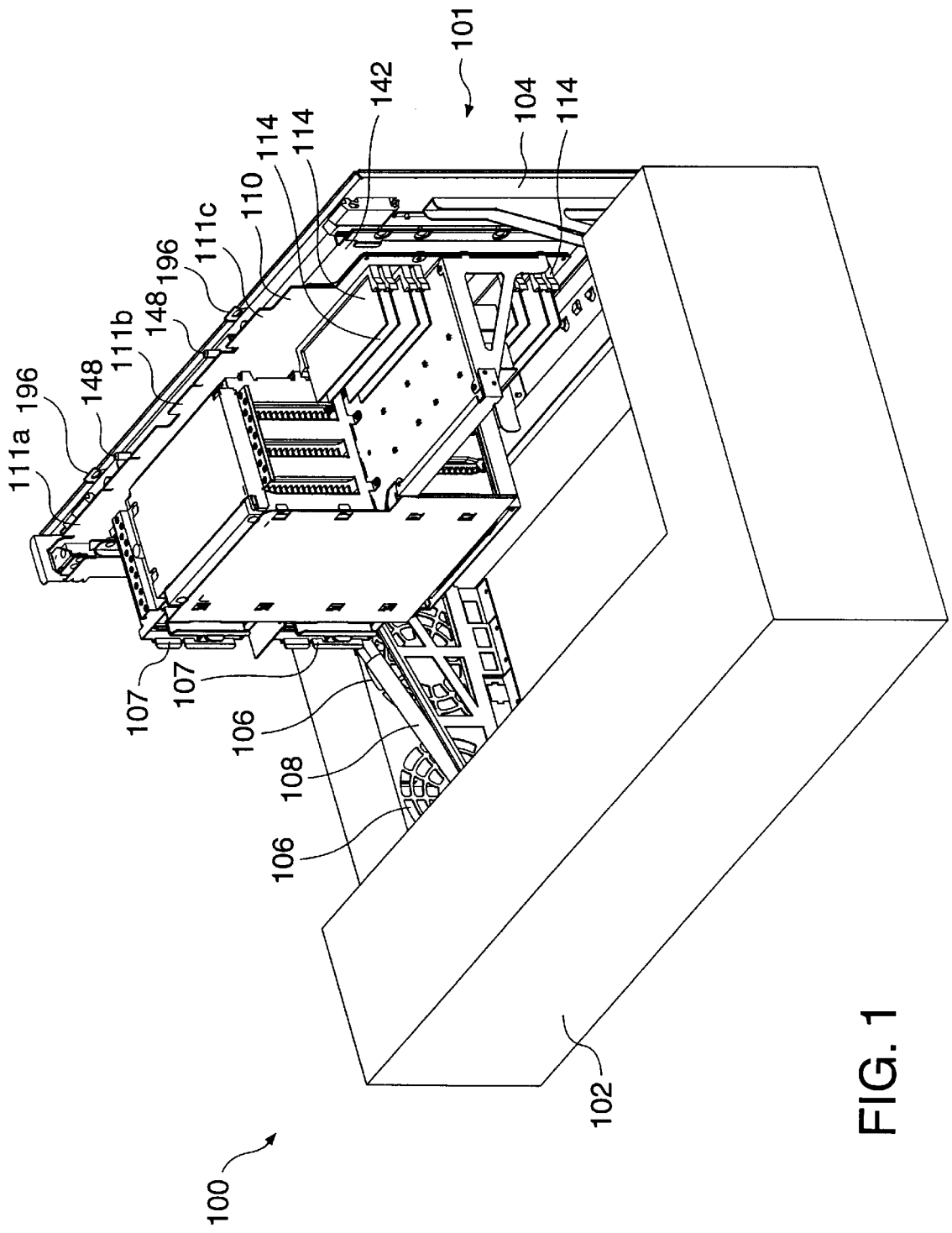
FIG. 1 is an isometric view of a computer system in accordance with an embodiment of the present invention.

FIG. 1 shows a computer system 100 having a circuit board assembly 101 in accordance with an embodiment of the present invention. Computer system 100 includes a housing 102 which encloses all of the components of the system. On a side of housing 102 is a door 104, shown in FIG. 1 in the open position. With door 104 in the open position, the internal components of computer system 100 can be easily accessed. To improve clarity, much of the detail of the interior of housing 102 is not shown. It will be understood that housing 102 includes various computer components, such as power supplies, a mid-plane circuit board for proving input/output (I/O) connections, and peripheral cards.

Circuit board assembly 101 is mounted on an interior side of the door 104 via a movable mount 160 (not shown in FIG. 1). Circuit board assembly 101 includes a board tray 142 and a circuit board 110 used as a base board for processor bays 112 and memory modules 114. Edge connectors 111 are formed along a forward edge of circuit board 110. In the embodiment shown, edge connectors 111 comprise one NLX-type 340 pin, 1 mm pitch edge connector 111a, one NLX-type 192 pin edge connector 111b, and one 50 pin, 2.54 mm pitch, standard edge connector 111c. Processor bay 112 can receive up to six microprocessors 116, and eight memory modules 114 may be, for example, SDRAM or other types of RAM memory. In the embodiment shown in FIG. 1, circuit board assembly 101 weighs approximately 30 pounds. Because of the significant weight of circuit board assembly 101, a hydraulic lift 108 is provided to allow door 104 to be opened and closed smoothly and to prevent door 104 from slamming shut. System cooling fans 106 are positioned so that they direct a cooling air flow across microprocessors 116, memory modules 114, and other computer components when door 104 is in the closed position. A set of processor cooling fans 107 may also be provided for additional cooling of processors 116.

Figure 2A:
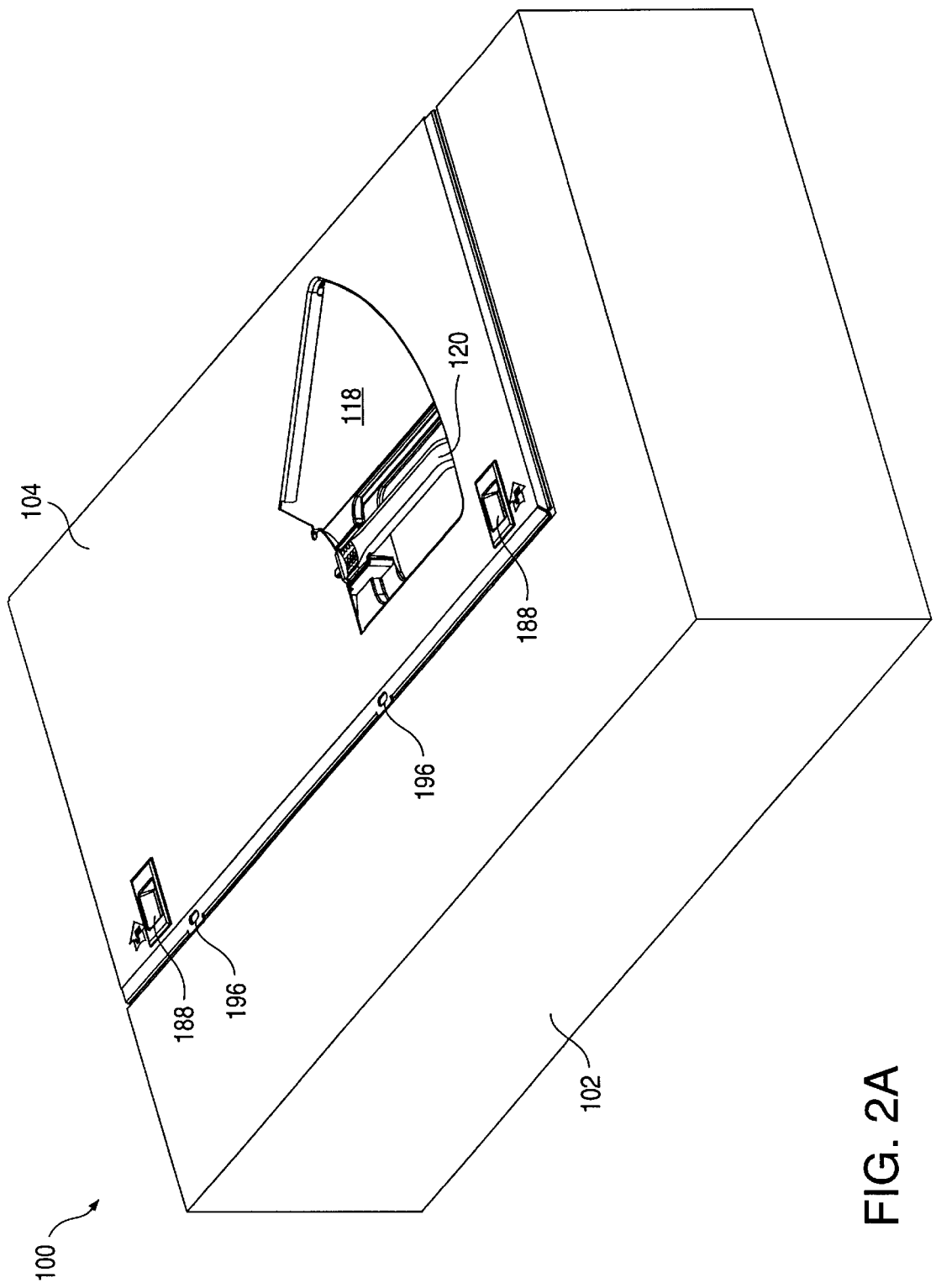
FIGS. 2a–2b are isometric views of the computer system with the housing door in the closed position.
Figure 2B:
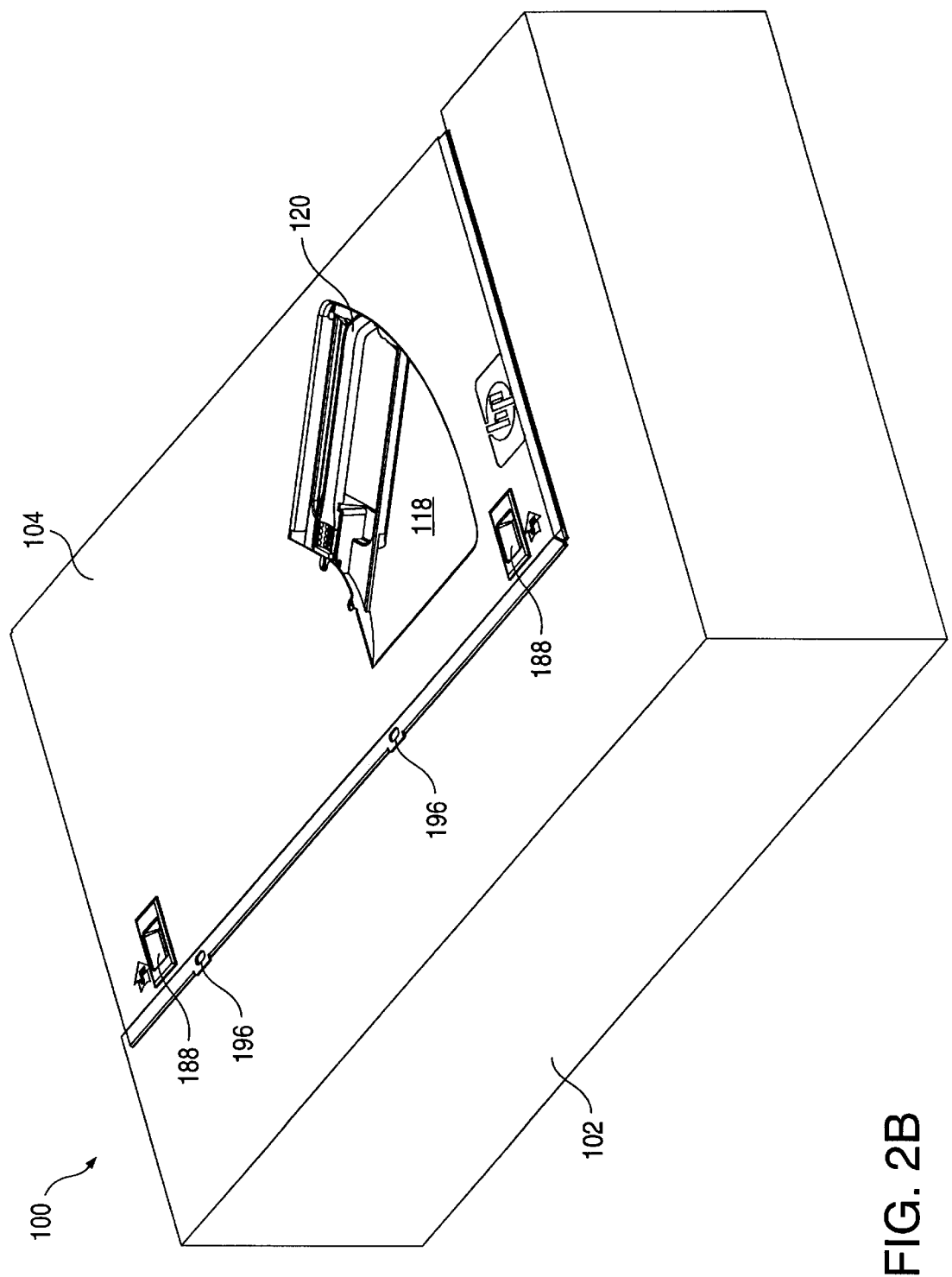

As shown in FIG. 2a, with door 104 of computer system 100 in the closed position, circuit board assembly 101 and the interior of housing 102 are no longer accessible. Handle 120 provided in a recess 118 on an exterior side of door 104 is used to mate edge connector 111a, 111b, 111c of circuit board 110 with connection sockets 124a, 124b, 124c (shown in FIG. 3), as will be described below. FIG. 2a shows handle 120 in the unlatched position, and FIG. 2b shows handle 120 in the latched position. Handle 120 may be made of glass-filled polycarbonate, which is advantageously lightweight, strong, and is easily manufactured.

Figure 3:
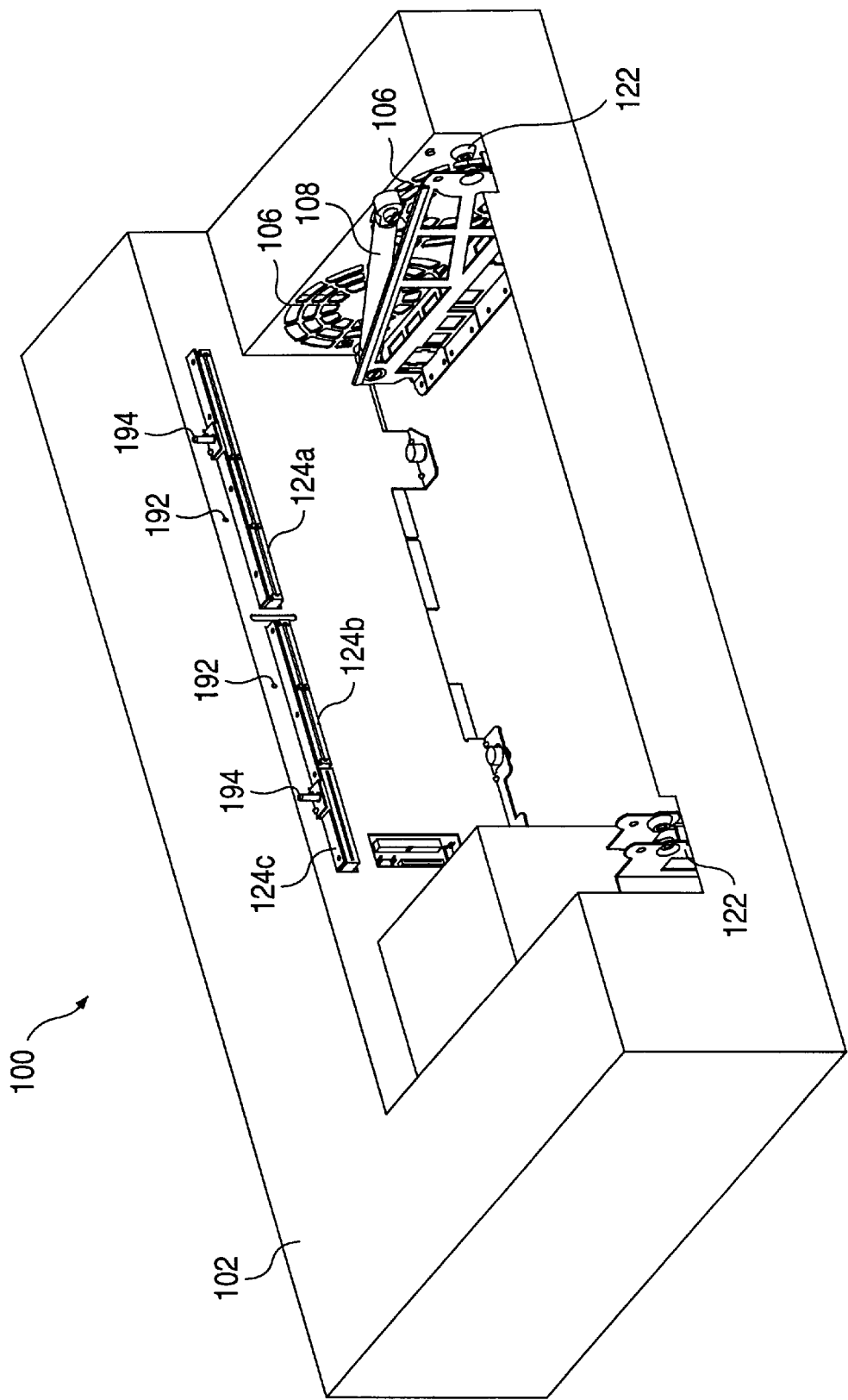
FIG. 3 is an isometric view of the computer system with the housing door removed.

FIG. 3 shows an isometric view of computer system 100 with door 104 removed to improve clarity. Door 104 is pivotally mounted through front and rear pivot brackets 141 onto joint members 122, which are provided on an interior of housing 102. Shoulder bolts through pivot brackets 141 (FIG. 4b) and joint members 122 securely connect door 104 to housing 102, and act as axles about which door 104 pivots. Connection sockets 124 are provided in the interior of housing 102 at a location such that when door 104 is in the closed position, edge connectors 111a, 111b, 111c of circuit board 110 are adjacent connection sockets 124a, 124b, 124c, respectively. In the embodiment shown, a clearance of 15.5 mm is provided between edge connectors 111 and connection sockets 124a, 124b, 124c so that door 104 can be moved between the opened and closed positions without edge connectors 111 and connection sockets 124a, 124b, 124c contacting each other. Connection sockets 124 connect the components of circuit board assembly 101 with a mid-plane board 190.

Figure 4A:
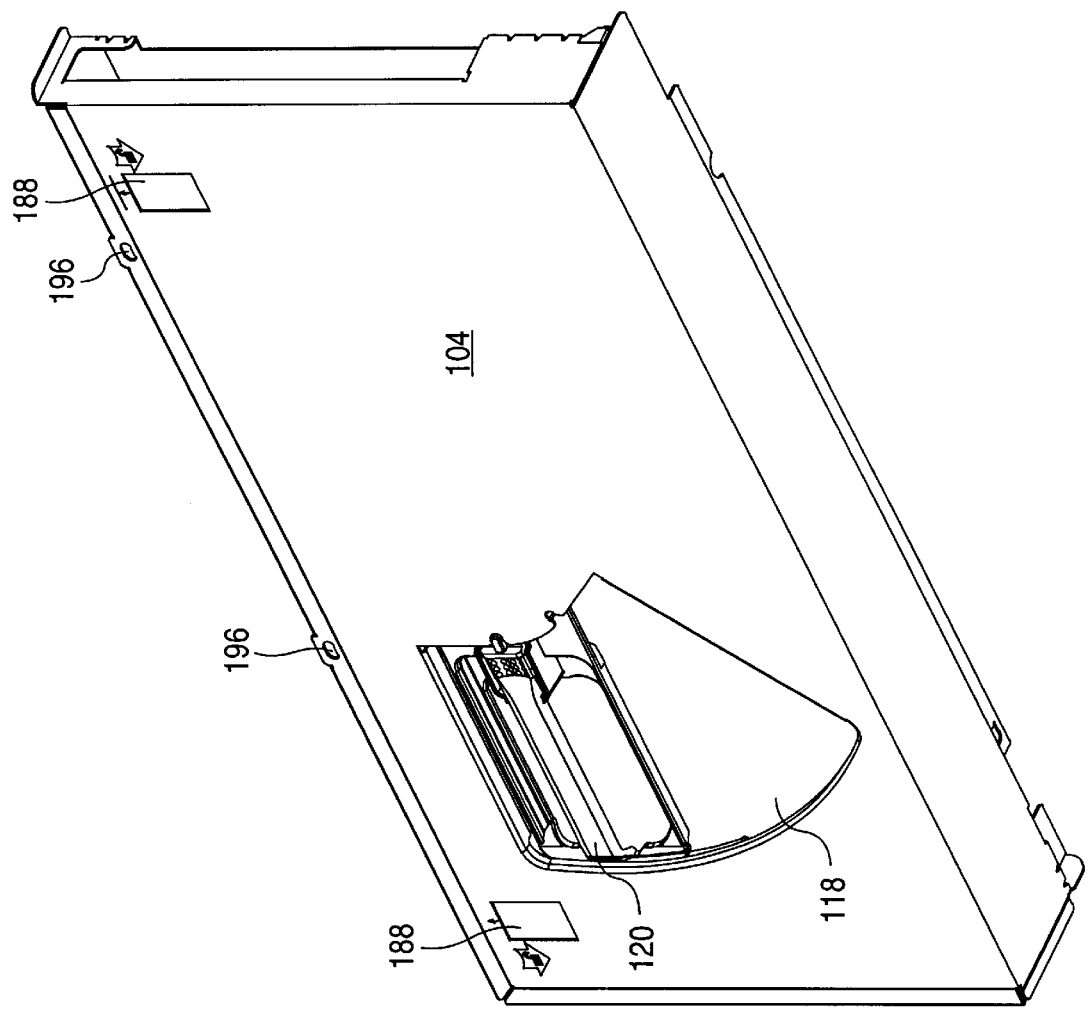
FIGS. 4a–4b are isometric views of the interior and exterior sides of the housing door.
Figure 4B:
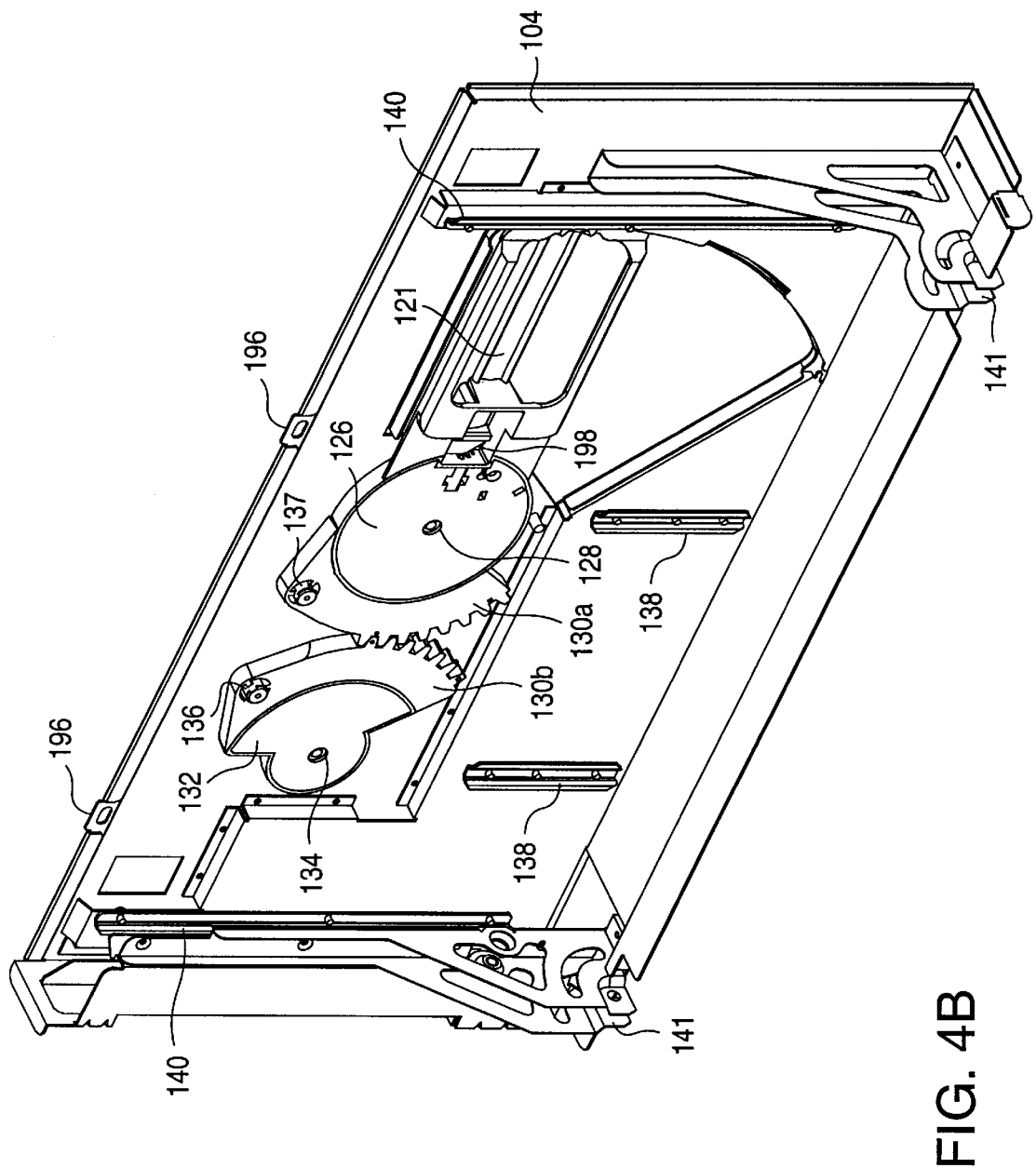

The exterior and interior sides of door 104 with circuit board assembly 101 removed are shown in FIGS. 4a and 4b, respectively. Latch driver 126 is rotatably mounted to the interior side of door 104 through first pivot point bolt 128, and engages latch follower 132 through gears 130a, 130b. Latch follower 132 is rotatably mounted to door 104 through second pivot point bolt 134. Interior handle portion 121 is provided on the interior side of door 104 to provide handle 120 with increased strength and integrity. First and second bosses 136 and 137 protrude from latch follower 132 and latch driver 126, respectively. Inner door rails 138 and outer door rails 140 are also provided on the interior side of door 104. Latch driver 126, latch follower 132, bosses 136 and 137, handle 120, and interior handle portion 121 comprise the driver portion of the computer system 100.

Figure 5A:
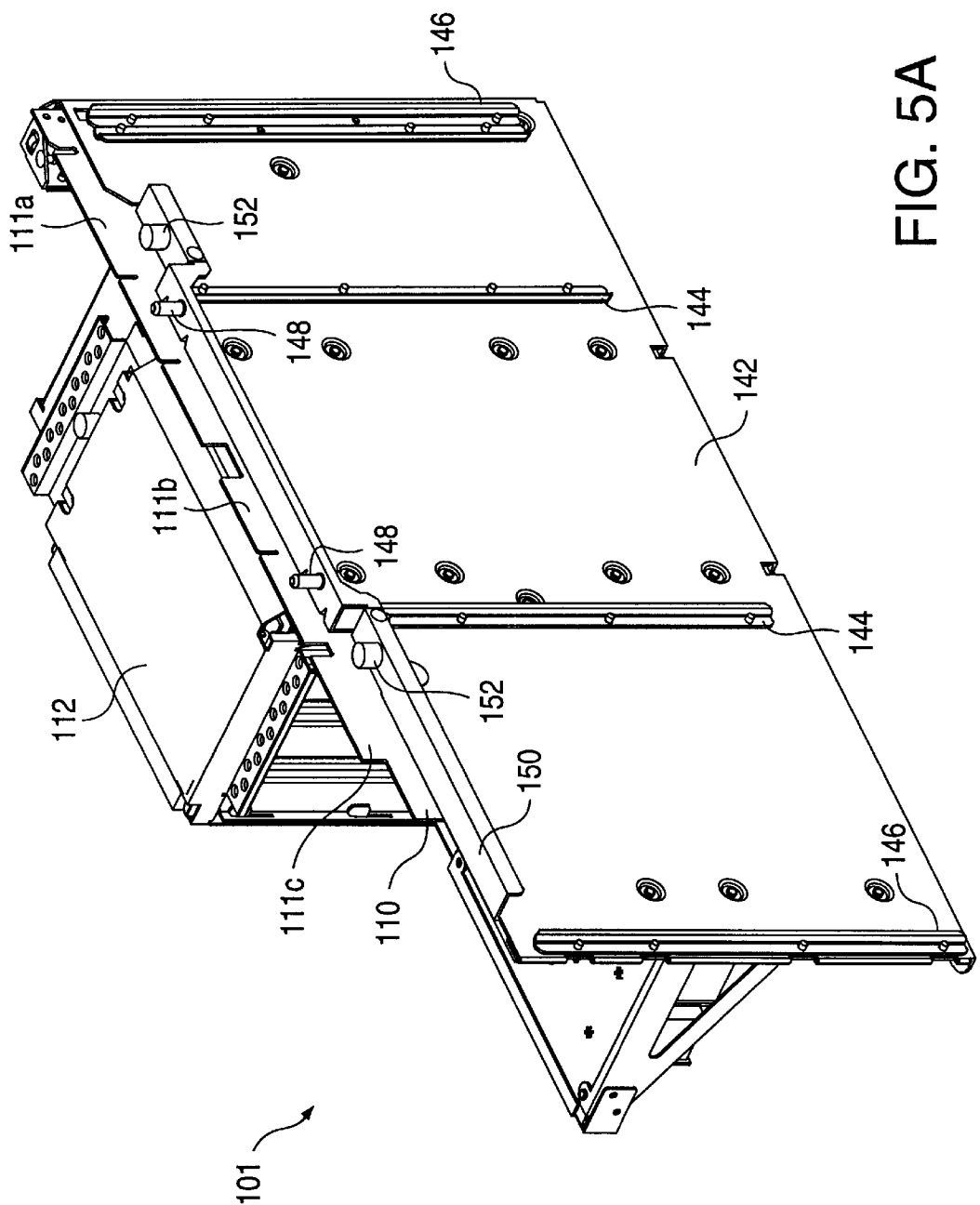
FIGS. 5a–5b are isometric views of the interior and exterior sides of a circuit board assembly.
Figure 5B:
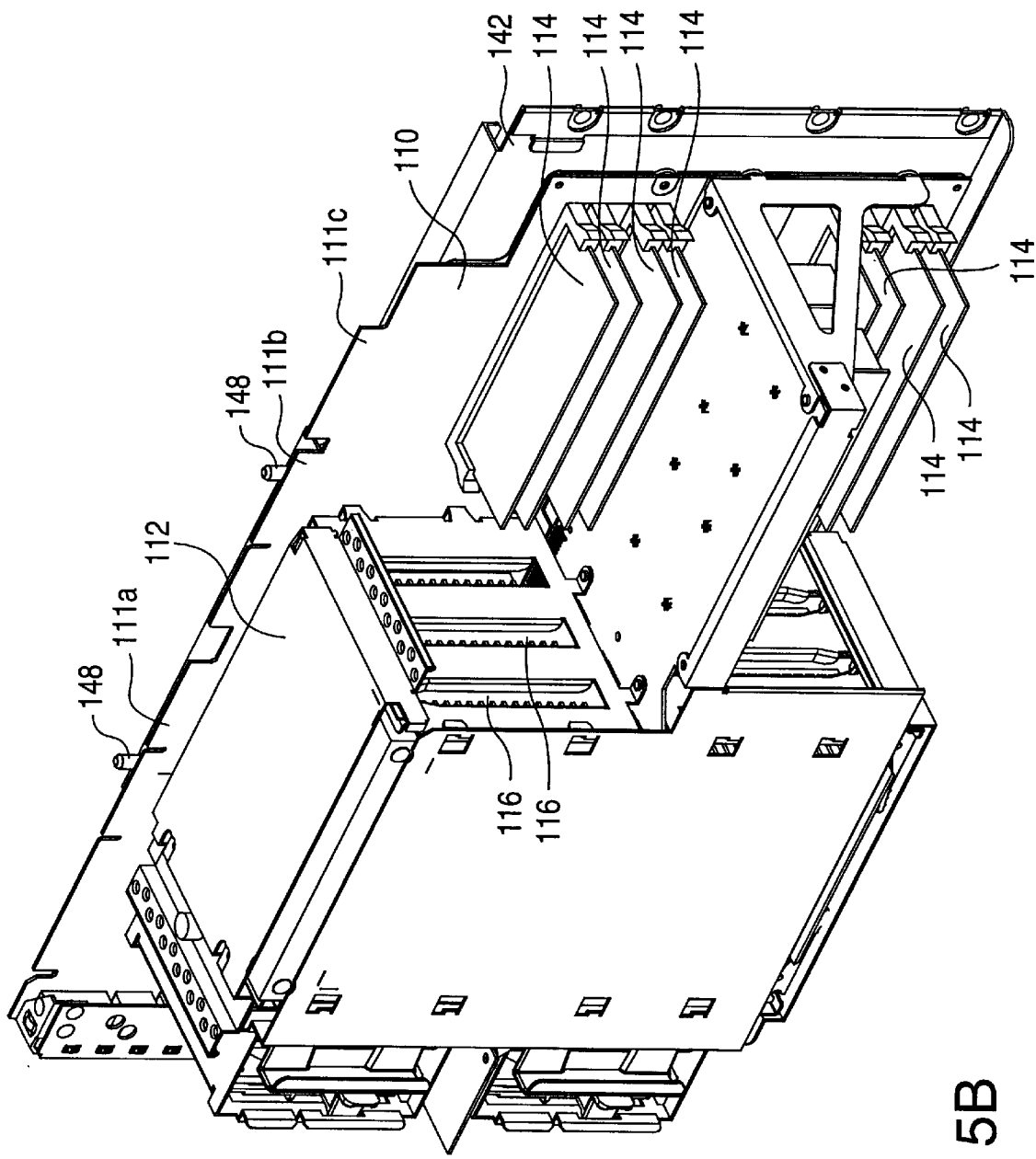
Figure 6B:
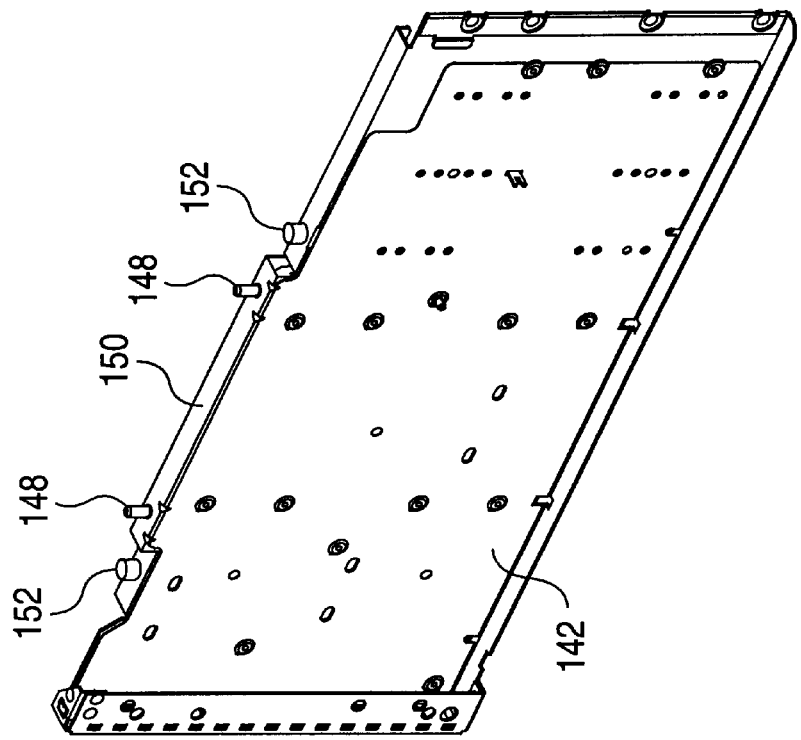
FIGS. 6a–6b are isometric views of the exterior and interior sides of a board tray.
Figure 6A:
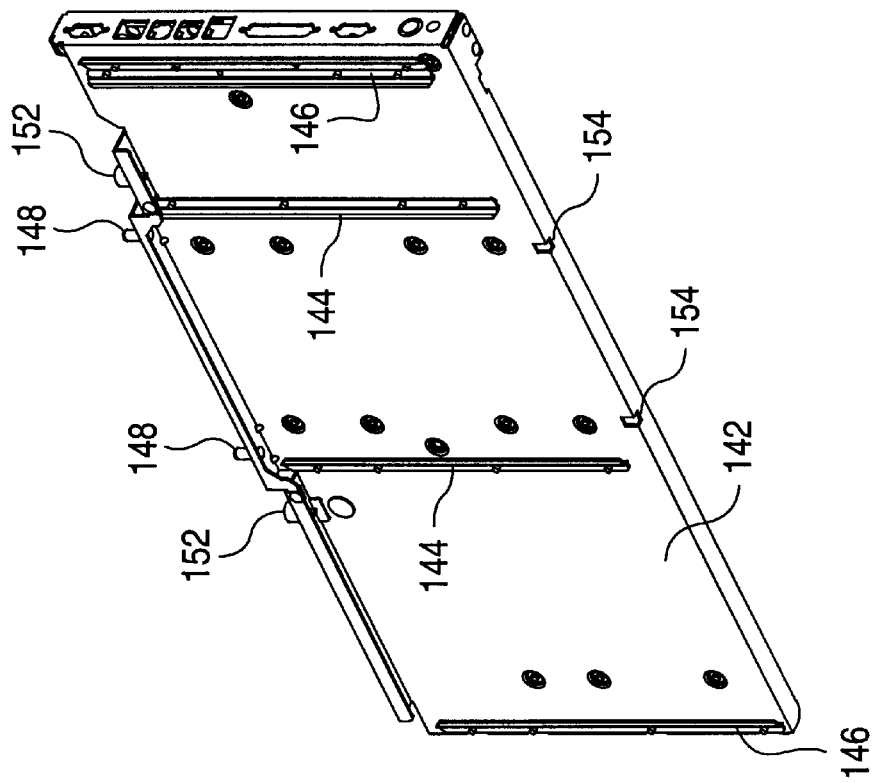

FIGS. 5a and 5b, respectively, show exterior and interior sides of circuit board assembly 101. Circuit board assembly 101 includes a board tray 142 having a set of inner tray rails 144 and a set of outer tray rails 146. The exterior and interior sides of board tray 142 are shown in FIGS. 6a and 6b, respectively. Circuit board assembly 101 also includes circuit board 110 and all of its mounted components. When circuit board assembly 101 is mounted on door 104, outer tray rails 146 on the exterior side of board tray 142 loosely mate with outer door rails 140 on the interior side of door 104, and inner tray rails 144 loosely mate with inner door rails 138, thereby allowing circuit board assembly 101 to linearly slide relative to door 104. Two locator pins 148 protrude from a shoulder 150 of board tray 142 in a forward direction. As used herein, forward is determined by the orientation of circuit board 110 and is defined as the direction in which circuit board 110 is moved to insert edge connectors 111 into their corresponding connection sockets 124.

Figure 7B:
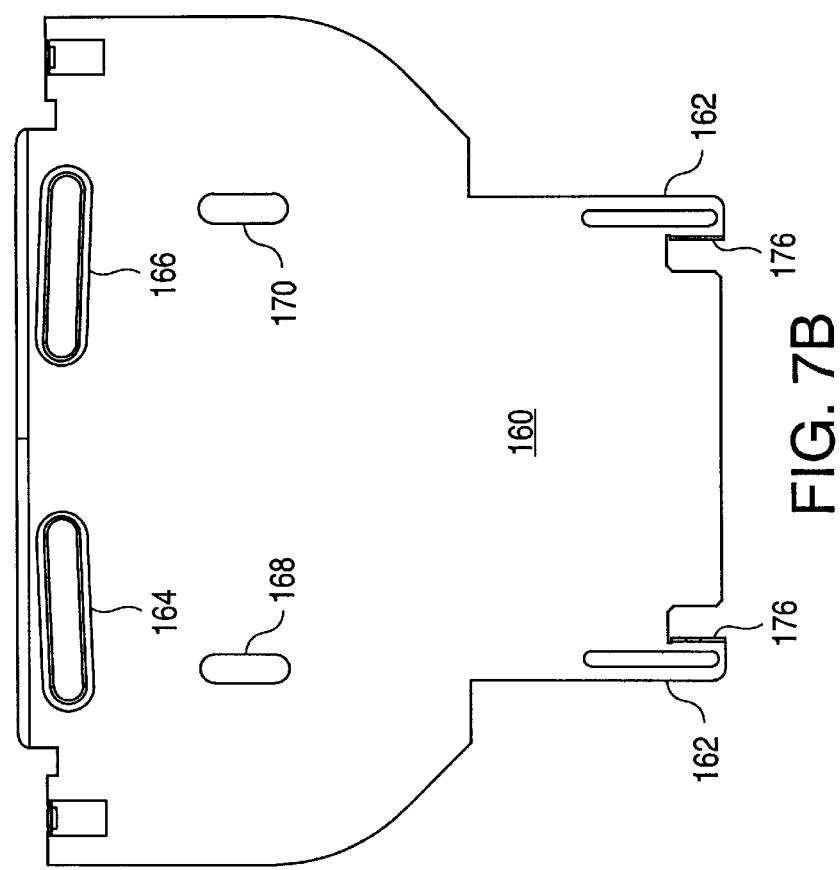
FIG. 7b is a plan view of the interior side of the movable mount.
Figure 7C:
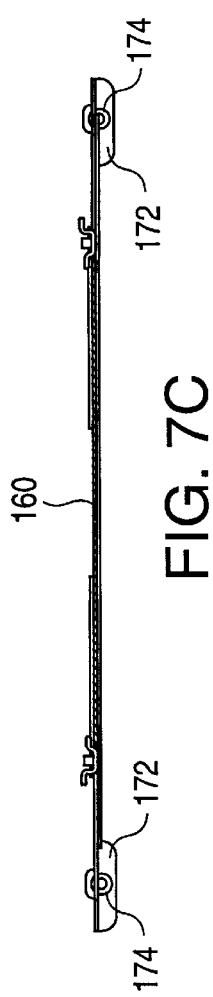
FIG. 7c is a bottom view of the movable mount.
Figure 7A:
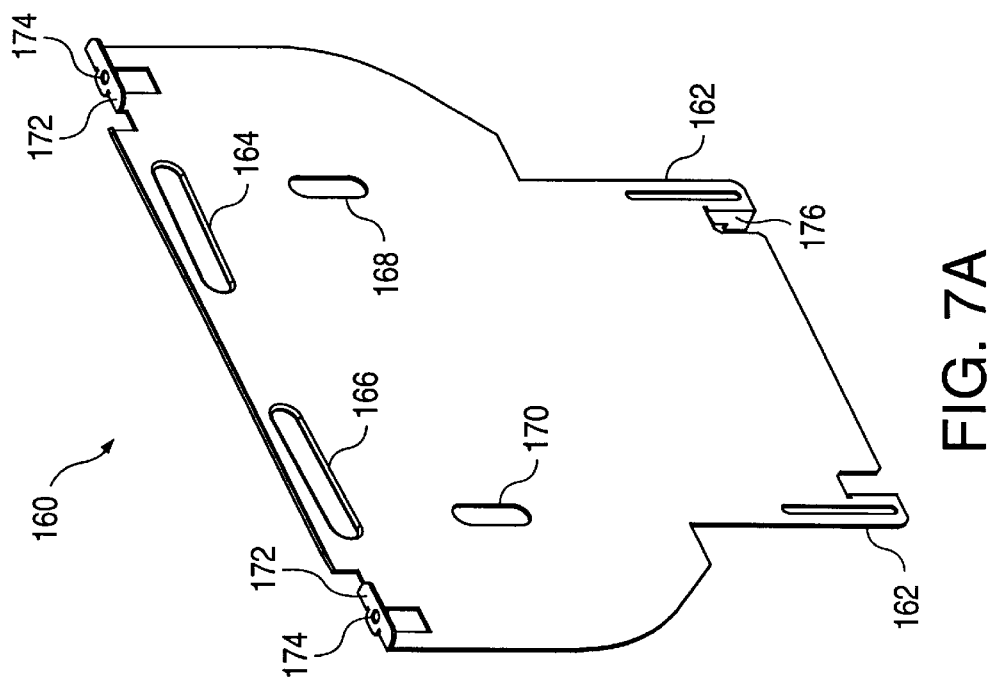
FIG. 7a is an isometric view of the exterior side of a movable mount.

FIGS. 7a, 7b, and 7c show isometric, plan, and top views, respectively, of movable mount 160 in accordance with one embodiment of the present invention. FIG. 7a shows the exterior side of mount 160, i.e., the side shown is adjacent to door 104 during operation. Movable mount 160 includes a first slot 164 and a second slot 166. Outer edges 162 on movable mount 160 loosely engage the inner portion of inner door rails 138 on the interior side of door 104, and allow movable mount 160 to slide forward and rearward relative to door 104. Flanges 172 provided at the top of movable mount 160 include holes 174 through which thumbscrews 152 (FIGS. 6a–6b) pass when board tray 142 is attached to movable mount 160. First center slot 168 and second center slot 170 provide clearance for pivot point bolts 134 and 128, allowing movable mount 160 to be more closely mounted to latch driver 126 and latch follower 132 on door 104. Tabs 176 provided at the bottom of mount 160 fit into notches 154 of board tray 142, thereby providing additional support for tray 142.

Figure 8A:
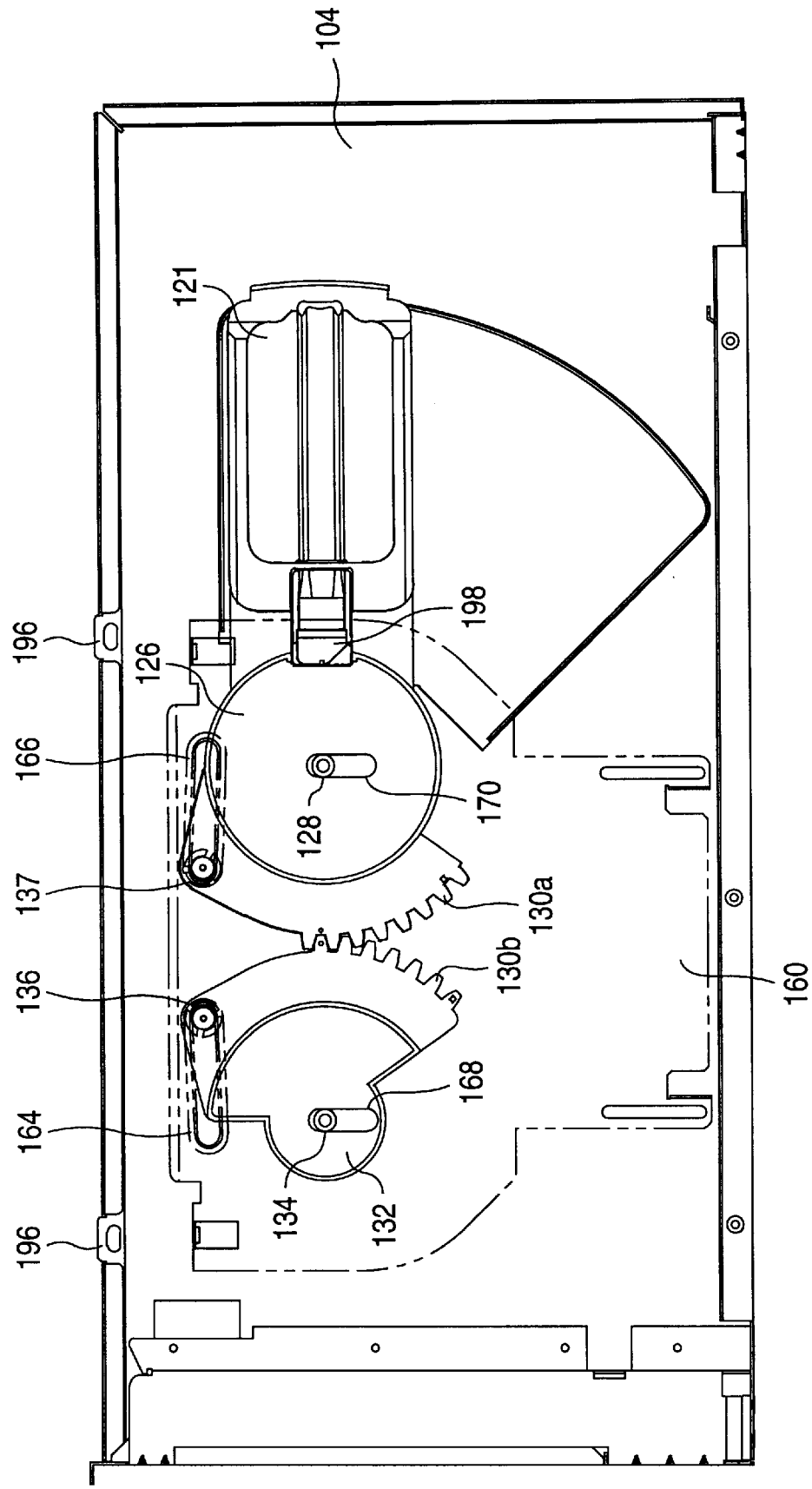
FIGS. 8a–8b are plan views of an interior side of a door.
Figure 8B:
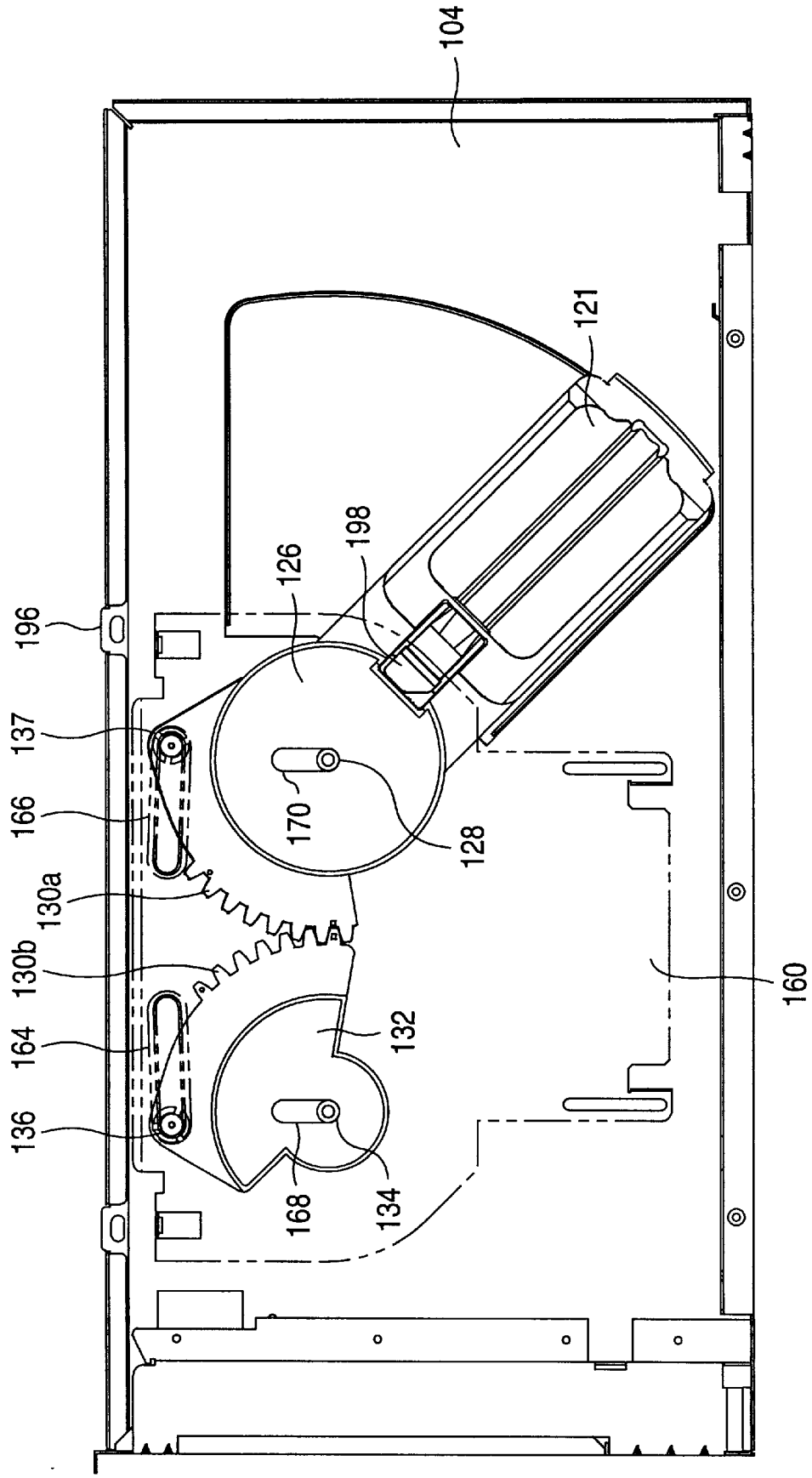

FIG. 8a shows in greater detail an interior side of door 104 with handle 120 in the unlatched position. The orientation of interior handle portion 121 provided on the interior side of door 104 corresponds to the orientation of handle 120, which is provided on the exterior side of door 104. An outline of movable mount 160 is shown using phantom lines. FIG. 8b shows the interior side of door 104 with handle 120 in the latched position.

The operation of this embodiment of the present invention is as follows. Movable mount 160 is attached to the interior side of door 104 by loosely engaging edges 162 on mount 160 with inner door rails 138 on door 104. Bosses 136 and 137 are received into slots 164 and 166, respectively. Edges 162 loosely engage inner door rails 138 to provide "float," wherein movable mount 160 is linearly guided by edges 162 and inner door rails 138 in forward and backward directions, but is capable of limited lateral movement.

Circuit board assembly 101 is attached to door 104 by slideably engaging outer tray rails 146 on board tray 142 with outer door rails 140 on door 104 and inner tray rails 144 with inner door rails 138. When circuit board assembly 101 is properly mounted, flanges 172 on movable mount 160 abut shoulder 150 on tray 142. The engagement between outer tray rails 146 and outer door rails 140 and between inner tray rails 144 and inner door rails 138 include additional clearance to allow "float" between board tray 142 and door 104. Thumbscrews 152 in board tray 142 securely attach to threaded fasteners 174 in movable mount 160, preventing relative movement between the two components. Tabs 176 at the bottom of movable mount 160 are received in notches 154 to provide additional support for circuit board assembly 101.

With circuit board assembly 101 in place, door 104 is closed. The driver mechanism enables blind mating, in which edge connectors 111 of circuit board 110 are mated with connection sockets 124 after door 104 is closed and circuit board 110 is no longer directly accessible by the user. When door 104 is closed, edge connectors 111 are aligned adjacent to connection sockets 124, but are separated by a distance of approximately 15.5 mm. This separation allows door 104 to be closed without edge connectors 111 grazing or otherwise making undesirable contact with connection sockets 124.

When handle 120 is in the unlatched position, as shown in FIG. 8a, movable mount 160 is in a rearward position such that pivot point bolts 128 and 134, which form the axes of rotation for latch driver 126 and latch follower 132, are located at the first forward end of slot 168 and second forward end of slot 170 of movable mount 160, and first boss 136 and second boss 137 are located at the inner ends of slots 164 and 166. As handle 120 is rotated into the latched position, latch driver 126 rotates in a clockwise direction, moving second boss 137 in a clockwise direction.

Figure 9:
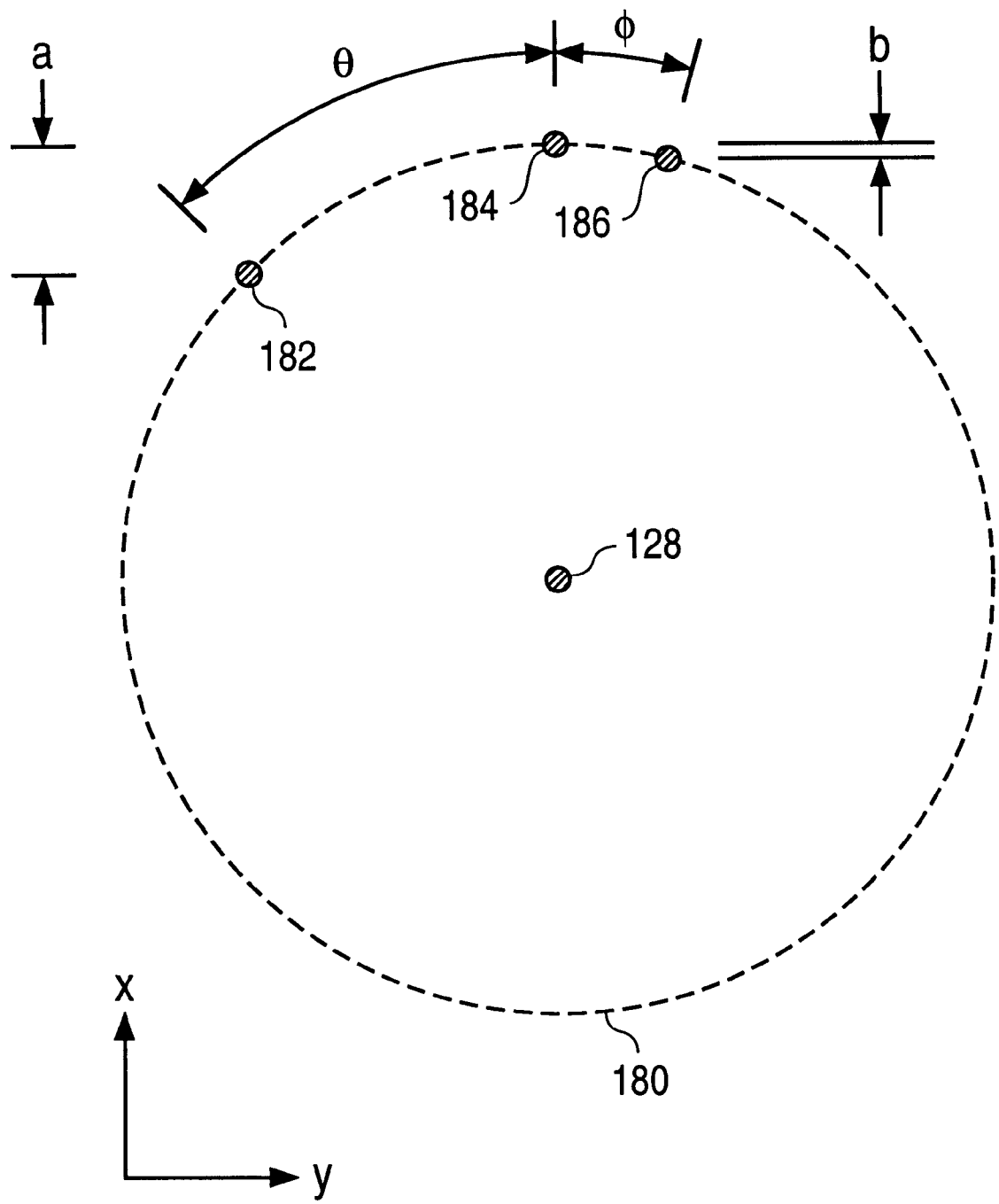
FIG. 9 illustrates the movement of a boss on a latch driver.

The path traced by second boss 137 as handle 120 is rotated is shown in FIG. 9. The x-direction corresponds to the forward direction, as defined by the orientation of the edge connectors 111 on circuit board 110. Circle 180 shows the radial location of second boss 137 relative to first pivot point bolt 128. Locations 182, 184, and 186 indicate positions of second boss 137 as handle 120 rotates. Location 184 defines a rotational position of 0°, location 182 defines a rotational position of θ greater than 0° and less than 180°, and location 186 defines a rotational position of φ less than 0°.

In the embodiment shown in FIG. 9, when handle 120 is in the unlatched position, second boss 137 is at first location 182, which corresponds to a rotational position of approximately 45°. As handle 120 is rotated from the unlatched position to the latched position shown in FIG. 8b, second boss 137 travels in a clockwise direction along the path traced by circle 180 until it reaches location 184, which is the forwardmost position along second boss 137's path. At this point, boss 137 has traveled forward a linear distance a in the x-direction. The shape of slot 166 in movable mount 160 allows free movement of second boss 137 in the y-direction, but any movement of boss in the x-direction forces boss 137 to abut the inner edge of slot 137. Thus, the forward movement of second boss 137 imparts a forward movement onto movable mount 160 through slot 166, thereby moving movable mount 160 and circuit board assembly 101 forward a distance a. Distance a is selected such that edge connectors 111 in circuit board 110 move forward sufficiently far such that connectors 111 are fully inserted into connection sockets 124.

Figure 10A:
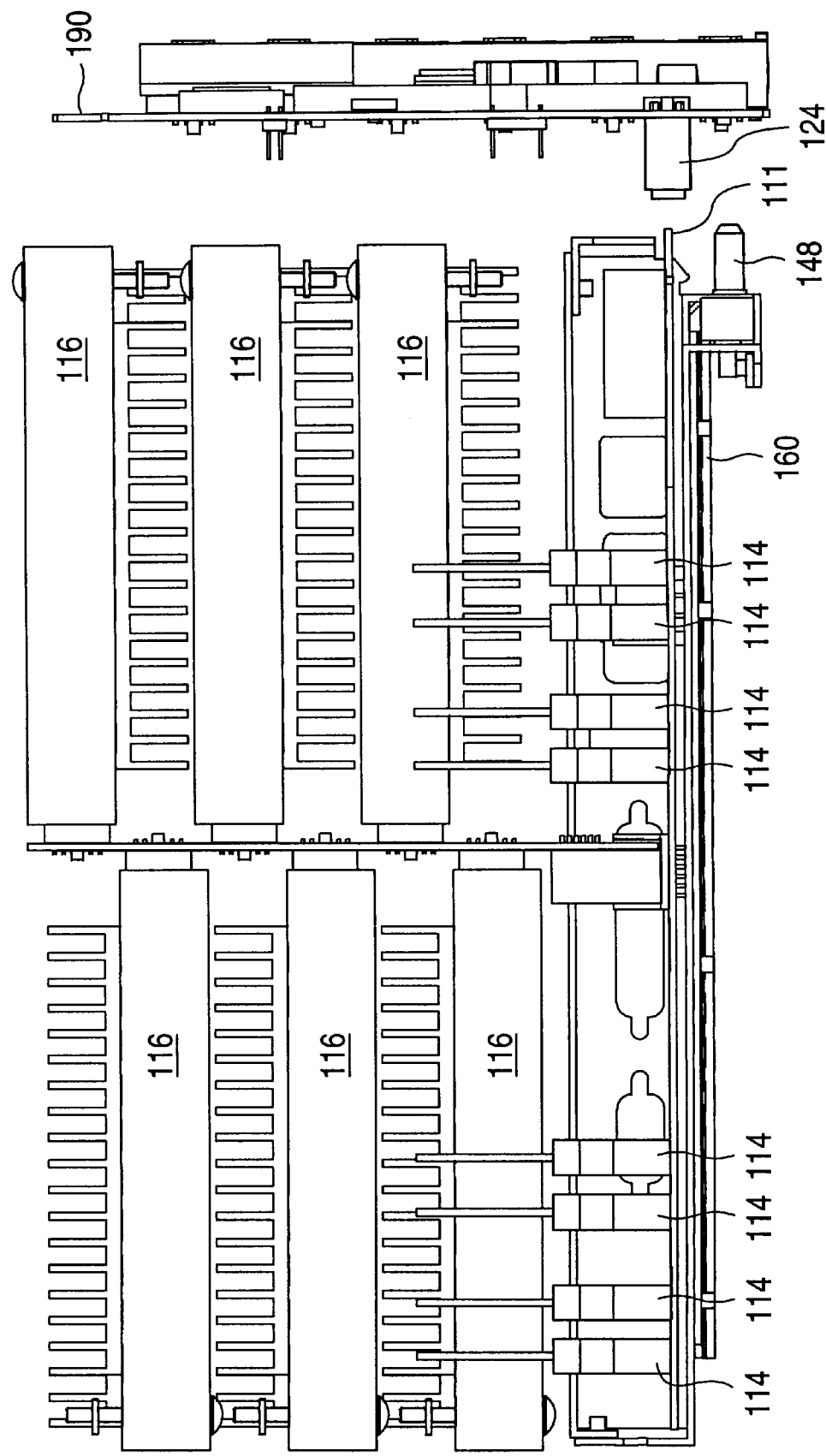
FIGS. 10a–10b are side views of the movement of a circuit board assembly.
Figure 10B:
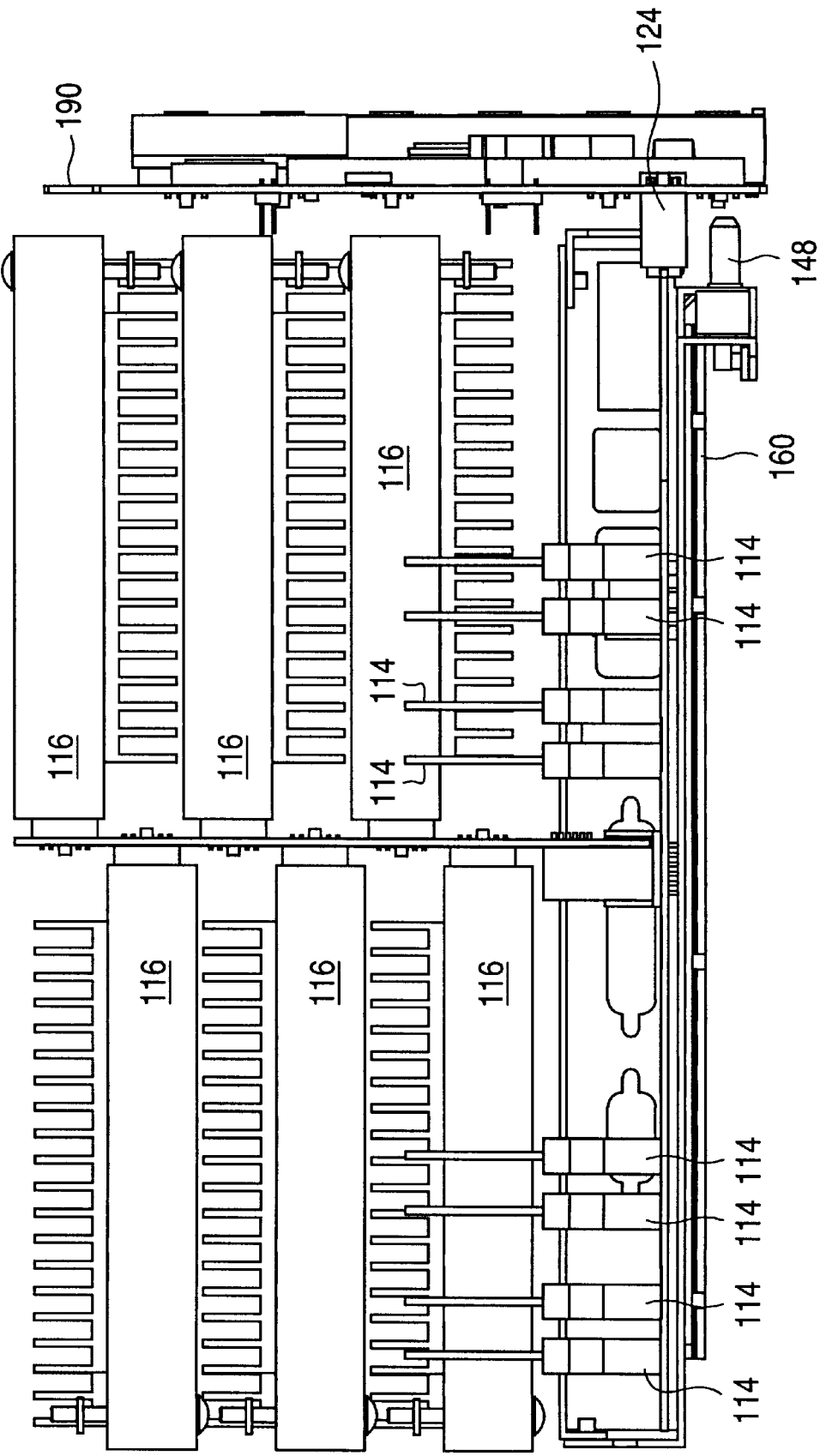

Side views of circuit board assembly 101 as handle 120 is moved into the latched position are illustrated in FIGS. 10a and 10b. FIG. 10a shows board assembly 101 with handle 120 in the unlatched position, such that edge connectors 111 are separated from connection sockets 124. When circuit board assembly 101 is moved forward a distance a by the driver mechanism, edge connectors 111 are fully inserted into connection sockets 124.

Latch follower 132 helps the driver mechanism to provide a more balanced, controlled force onto movable mount 160. Gears 130a on latch driver 126 engage gears 130b on latch follower 132 such that the clockwise rotation of latch driver 126 imparts a counter-clockwise rotation of latch follower 132. As handle 120 is moved from the unlatched position to the latched position, first boss 136 on latch follower 132 imparts a force onto slot 164 in a similar way as described above with respect to second boss 137. Providing two equal forces onto movable mount 160 results in a more balanced insertion of edge connectors 111.

Edges 162 on mount 160 and outer tray rails 146 on board tray 142 are used to help guide the movement of movable mount 160 in the x-direction. Because of the number of moving parts, manufacturing tolerances, and flexibility of various members in the computer system 100, as movable mount 160 slides forward, edge connectors 111 and connection sockets 124 may not be perfectly aligned. As described above, outer tray rails 146 loosely mate with outer door rails 140 to provide circuit board assembly 101 with "float," which accommodates for imprecision in the alignment of edge connectors 111 and connection sockets 124. Similarly, edges 162 are provided with "float" in their engagement with inner door rails 138. The "float" allows circuit board 110 to be slightly shifted laterally when being mated with connection sockets 124.

Locator pins 148 are used as alignment inserts to guide circuit board assembly 101 as it is being pushed into place by the driver mechanism. As handle 120 begins to move to the latched position but before edge connectors 111 mate with connection sockets 124, locator pins 148 meet locator pin holes 192 in housing 102. Locator pin holes 192 serve as alignment receivers and may be formed in a funnel-like shape such that if locator pins 148 are slightly off-center, they are guided to the proper position as circuit board assembly 101 continues moving forward. Accordingly, the "float" provided by the railing system allows the entire circuit board assembly 101 to be shifted laterally by the mating of pins 148 with holes 192 in order to obtain the proper alignment. Door guide pins 194 protrude upwards from housing 102 and mate with door guide pin holes 196 on door 104. Door guide pins 194 and holes 196 serve to further align edge connectors 111 with connection sockets 124.

In an alternative embodiment, edges 162 and outer tray rails 146 precisely engage inner door rails 138 and outer door rails 140 on door 104 such that no float is provided. In such an arrangement, the alignment and tolerances of the elements in computer system 100 involved with the mating of circuit board assembly 101 are tightly controlled to ensure repeatable connections and disconnections of edge connectors 111.

The embodiment shown in FIGS. 8a–8b include an overtravel mechanism to prevent inadvertent disconnection of edge connectors 111 from connection sockets 124 in the event of a mechanical shock to system 100. As handle 120 is moved into the latched position, latch driver 126 rotates such that second boss 137 moves beyond the uppermost location 184. When handle 120 reaches the fully latched position, second boss 137 comes to rest at third location 186. At this point, second boss 137 has moved to a rotational position φ of approximately −5°, which corresponds to a linear distance b in a rearward direction. Distance b is sufficiently small that, despite the slight rearward movement of circuit board 110 imparted by the overtravel of second boss 137, edge connectors 111 retain a secure and complete contact with connection sockets 124. Once second boss 137 has reached location 186, it is prevented from traveling any further in the clockwise direction because second boss 137 abuts the end of slot 166.

Any force applied to circuit board assembly 101 in the rearward direction would be passed onto second boss 137 through movable mount 160. With handle 120 in the overtravel position, a rearward force applied to second boss 137 would tend to force latch driver 126 to rotate in the clockwise direction. Because latch driver 126 is prevented from any further rotation in that direction, circuit board assembly 101 is essentially locked in place until latch driver 126 is rotated in a counter-clockwise direction to move second boss 137 beyond the forwardmost location 184. Latch follower 132 and first boss 136 provide a similar overtravel protection as described above.

In order to open door 104, the above-described process of mating circuit board assembly 101 is reversed. Handle 120 on the exterior of door 104 is rotated from the latched to the unlatched position, which causes second boss 137 to rotate from location 186 to location 182. As boss moves in the x-direction, it presses against a rearward edge of slot 166, thereby moving movable mount 160 in the rearward direction and withdrawing edge connectors 111 from connection sockets 124. Once edge connectors 111 are fully withdrawn, door 104 can be safely opened without damaging circuit board assembly 101.

Manual door latches 188 can be used to lock door 104 in place when computer system 100 is in use. Solenoid latch 198 provides an additional protection against inadvertent disconnection of the edge connector 111. Latch 198 is electronically coupled to the power supply in computer system 100 such that when computer system 100 is receiving power and is in use, latch 198 closes. With latch 198 closed, handle 120 is locked in place, preventing any rotation. After the power to system 100 is shut off, solenoid latch 198 opens, allowing handle 120 to be rotated to the unlatched position.

As can be seen from the figures, the above-described embodiment of the present invention enables blind mating of a circuit board with the edge connectors using an insertion mechanism which resides adjacent to the bottom surface of the board. This design is less intrusive than earlier approaches, and provides simple, unobstructed access to the interior of the computer system. In another embodiment of the present invention, the driver mechanism and circuit board assembly are not be mounted onto a door in the housing, but instead are contained elsewhere within the housing.

Although the invention has been described with reference to particular embodiments, the description is only an example of the invention's application and should not be taken as a limitation. In particular, even though in the description above circuit board 110 is mounted such that edge connector 111 is oriented along an edge of door 104 farthest from the side about which door 104 rotates, in alternative embodiments, circuit board 110 can be mounted in any orientation. In another embodiment, circuit board assembly 101 comprises a circuit board alone, and is mounted directly to movable mount 160 without the use of board tray 143. Further, although the embodiments described above refer to a computer system, the electronic system in accordance with the present invention need not be limited to a computer. Various other adaptations and combinations of features of the embodiments disclosed are within the scope of the invention as defined by the following claims.

We claim:

1. An electronic system, comprising:
   a housing including a plurality of walls;
   a door provided on a wall of said housing, said door having an open position and a closed position;
   a connection socket provided on an interior portion of said housing;
   an insertion mechanism mounted on said door, said insertion mechanism comprising:
      a driver portion accessible from an exterior side of said door and being movable from an unlatched position to a latched position; and
      a movable mount provided on an interior side of said door and being mechanically coupled to said driver portion; and
   a circuit board assembly mounted on said movable mount and having an edge connector along a forward edge of said circuit board assembly such that when said driver portion moves from said unlatched position to said latched position, said movable mount moves in a forward direction, inserting said edge connector into said connection socket.

2. The computer system of claim 1, wherein said driver portion further comprises:
   a handle provided on the exterior side of said door; and
   a latch driver rotatably connected to said door through a first axis of rotation and connected to said handle, said latch driver engaging said movable mount such that movement of said handle from said unlatched position to said latched position rotates said latch driver in a first latching direction thereby exerting a force on said movable mount in said forward direction.

3. The computer system of claim 1, further comprising:
   a first set of rails on said interior side of said door extending from a rearward position to a forward position;
   wherein said movable mount is loosely mounted onto said first set of rails such that said first set of rails guide movement of said movable mount in a linear rearward-to-forward direction while allowing some lateral movement.

4. The computer system of claim 1, further comprising:
   a second set of rails on said interior side of said door extending from a rearward position to a forward position;

wherein said circuit board assembly is loosely mounted onto said second set of rails such that said second set of rails guide movement of said circuit board assembly in a linear rearward-to-forward direction while allowing some lateral movement.

5. The computer system of claim 1, further comprising:
a power supply in said housing; and
a latch on said driver portion connected to said power supply such that when power is being provided to the computer system through said power supply, said latch prevents movement of said driver portion from said latched position to said unlatched position.

6. The computer system of claim 1, further comprising:
an alignment insert provided on said housing; and
an alignment receiver provided on said movable mount, such that as said driver portion moves from said unlatched position to said latched position, said alignment insert is received into said alignment receiver to guide said edge connector into said connection socket.

7. The computer system of claim 1, further comprising:
an alignment receiver provided on said housing; and
an alignment insert provided on said movable mount, such that as said driver portion moves from said unlatched position to said latched position, said alignment insert is received into said alignment receiver to guide said edge connector into said connection socket.

8. The computer system of claim 2, further comprising:
a first set of gears provided on said latch driver; and
a latch follower rotatably connected to said door through a second axis of rotation, said latch follower having a second set of gears engaging said first set of gears such that rotation of said latch driver in said first latching direction causes rotation in said latch follower in a second latching direction, said latch follower further having a second boss engaging said movable mount such that rotation of said latch follower in said second latching direction causes said second boss to exert a force on said movable mount in said forward direction.

9. The computer system of claim 2, further comprising:
a first boss on said latch driver; and
a first slot provided in said movable mount, said first boss engaging an interior portion of said first slot such that movement of said handle from said unlatched position to said latched position rotates said latch driver, thereby causing said first boss to exert a force on said first slot in said forward direction.

10. The computer system of claim 6, wherein:
said alignment insert comprises a locator pin adjacent said connection socket; and
said alignment receivers comprises a locator pin hole in said movable mount.

11. The computer system of claim 7, wherein:
said set of alignment receivers comprises a pair of channeling receivers adjacent said connection socket; and
said set of alignment inserts comprises a pair of locator pins in said movable mount.

12. The computer system of claim 9, wherein said first slot is a linear slot substantially perpendicular to said forward direction.

13. The computer system of claim 9, wherein:
said forward direction defines a rotation angle of about 0° for a rotational position of said first boss relative to said first axis of rotation;
when said handle is in said first position, said rotational position of said first boss relative to said first axis of rotation defines a rotation angle X, X being less than or equal to about 180°; and
when said handle is moved from said unlatched position to said latched position, said rotation angle decreases.

14. The computer system of claim 13, wherein when said handle is in said latched position, said rotational position of said boss relative to said first axis of rotation defines a rotation angle Y, Y being less than 0° but greater than −30°.

15. The computer system of claim 13, further comprising a second slot provided in said movable mount, said second boss engaging an interior portion of said second slot.

16. The computer system of claim 15, wherein said second slot is a linear slot substantially perpendicular to said forward direction.

17. A method for mounting a circuit board assembly with an edge connector, comprising:
providing a housing having an open door on one side and a connection socket therein;
providing a movable mount on an interior side of said door;
mounting a circuit board assembly onto said movable mount;
closing said door; and
actuating a driver from an exterior side of said door, said driver moving said movable mount in a forward direction to mate said edge connector with said connection socket.

18. The method of claim 17, wherein said actuating said driver comprises rotating a handle provided on said exterior side of said door, said handle connected to and rotating a latch driver on said interior side of said door, said rotating latch driver propelling said movable mount in said forward direction.

19. A computer system, comprising:
a housing;
a rail system provided on said housing;
a driver portion, comprising:
a handle having a unlatched position and a latched position; and
a latch driver connected to said handle and rotatably connected to said housing through a first axis of rotation;
a mount slideably attached to said rail system and engaging said latch driver such that as said handle is moved from said unlatched position to said latched position, said latch driver exerts a force on said mount in a forward direction urging said mount from a first location along said rail system to a second location along said rail system;
a connection socket provided on said housing; and
a circuit board assembly having an edge connector provided along a forward edge, said circuit board assembly being attached to said mount such that when said mount is in said first location, said edge connector is distant from said connection socket, and when said mount is in said second location, said edge connector is mated with said connection socket.

20. The computer system of claim 19, wherein:
said latch driver includes a first boss located at a position offset from said first axis of rotation such that rotation of said latch driver results in rotational translation of said first boss;
and said first boss abuts said mount such that rotational movement of said boss urges said mount in a direction of said rail system.

21. The computer system of claim 19, further comprising:

a first set of gears provided on said latch driver;

a latch follower rotatably connected to said housing through a second axis of rotation; and a second set of gears provided on said latch follower and engaging said first set of gears such that rotation of said latch driver causes rotation of said latch follower;

wherein said mount engages said latch follower such that when said handle is moved from said unlatched position to said latched position, said latch follower exerts a force on said mount in said forward direction.

22. The computer system of claim 19, wherein said movable mount is loosely attached to said rail system such that said rail system guides movement of said movable mount in a linear rearward-to-forward direction yet allows some lateral movement.

23. The computer system of claim 19, wherein said rail system, said driver portion, said mount, and said circuit board assembly are mounted on a door provided on one side of said housing.

24. The computer system of claim 19, further comprising:

a power supply in said housing; and a latch on said driver portion connected to said power supply such that when power is being provided to the computer system through said power supply, said latch prevents movement of said handle from said latched position to said unlatched position.

25. The computer system of claim 19, further comprising:

an alignment insert provided on said housing; and an alignment receiver provided on said mount, such that as said driver portion moves from said unlatched position to said latched position, said alignment insert is received into said alignment receiver to guide said edge connector into said connection socket.

26. The computer system of claim 19, further comprising:

an alignment receiver provided on said housing; and an alignment insert provided on said mount, such that as said driver portion moves from said unlatched position to said latched position, said alignment insert is received into said alignment receiver to guide said edge connector into said connection socket.

27. The computer system of claim 20, wherein said mount defines a slot non-parallel to said direction of said rail system, said first boss abutting an interior portion of said slot.

28. The computer system of claim 20, wherein:

said forward direction defines a rotation angle of 0° for said latch driver;

when said handle is in said first position, said position of said boss relative to said first axis of rotation defines a rotation angle X, X being less than or equal to 180°; and when said handle is moved from said first position to said second position, said rotation angle defined by said position of said boss relative to said first axis decreases.

29. The computer system of claim 25, wherein:

said alignment insert comprises a locator pin adjacent said connection socket; and said alignment receivers comprises a locator pin hole in said mount.

30. The computer system of claim 26, wherein:

said set of alignment receivers comprises a pair of channeling receivers adjacent said connection socket; and said set of alignment inserts comprises a pair of locator pins in said mount.

31. The computer system of claim 27, wherein said slot is substantially perpendicular to said direction of said rail system.

32. The computer system of claim 28, wherein when said handle is in said second position, said position of said boss relative to said first axis of rotation defines a rotation angle Y, Y being less than 0° but greater than −30°.

* * * * *